Oct. 10, 1967 R. L. FLEISCHER 3,346,425

SUPERCONDUCTORS

Filed April 1, 1964 2 Sheets-Sheet 1

Inventor:
Robert L. Fleischer,
by Richard R. Green
His Attorney.

Inventor:
Robert L. Fleischer,
by Richard G. [signature]
His Attorney.

United States Patent Office 3,346,425
Patented Oct. 10, 1967

3,346,425

SUPERCONDUCTORS

Robert L. Fleischer, Schenectady, N.Y., assignor to General Electric Company, a corporation of New York Filed Apr. 1, 1964, Ser. No. 356,377
3 Claims. (Cl. 148—4)

Figure 1:
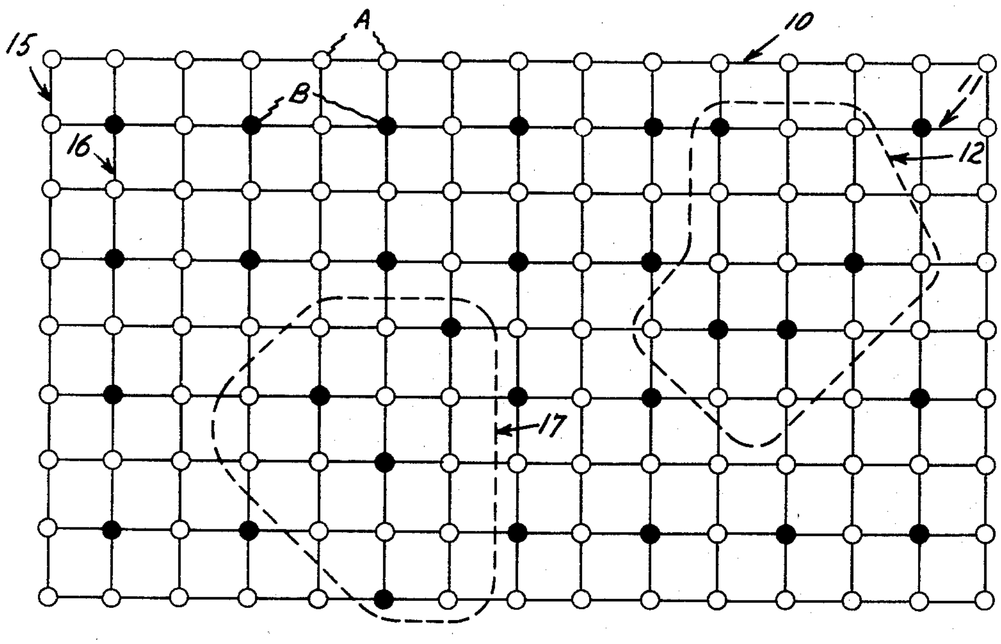

This invention relates to superconductive materials and more particularly to superconductive metal alloys of the substitutional type which have been irradiated to improve their superconductive properties, especially the critical current density.

While the existence of superconductivity in many metals, metal alloys and metal compounds has been known for many years, the phenomenon has been more or less treated as a scientific curiosity until comparatively recent times. The awakened interest in superconductivity may be attributed, at least in part, to technological advances in the arts where their properties would be extremely advantageous and to advances in cryogenics which removed many of the economic and scientific problems involved in extremely low temperature operations.

As is well known, "superconduction" is a term describing the type of electrical current conduction existing in certain materials cooled below a critical temperature, $T_c$, where resistance to the flow of current is essentially nonexistent. Like a normally conductive material, a superconductive material, that is, any material having a critical temperature $T_c$ below which normal resistance to the flow of electrical current is absent, can be subjected to an applied magnetic field when cooled below $T_c$ and a current will be induced therein. The current in the superconductive material, however, even with the removal of the applied magnetic field, will theoretically continue for an infinite time and is therefore called "supercurrent" to distinguish it from the usual current present at temperatures above the critical temperature $T_c$. But, supercurrents will exist in those materials classified as "soft" superconductors only if a geometry is provided which has a multiply-connected surface as opposed to a simply-connected surface, and the applied magnetic field is below a critical magnetic field, $H_c$. A solid cylinder is an example of a simply-connected body, and a cylinder having an axial bore or a hollow sphere are examples of multiply-connected bodies. In the case of hard superconductors, supercurrents will exist without regard to the geometry of the body, since they are inherently multiply-connected. Here, assuming the low temperature requirement which is present in all cases, the applied magnetic field need only be below the critical field, $H_c$.

The terms "hard" and "soft," as applied to superconductors, originally refer principally to these physical properties of the materials. Subsequently however, the terms have ordinarily been used when referring to the magnetic properties, although there is often a correlation between the physical and magnetic hardness and softness. As a general matter, it may now be assumed that a hard superconductive body is one wherein, either by virtue of composition or geometry, or both, the application of a subcritical magnetic field to it at temperatures below $T_c$ will result in magnetic flux being "trapped," that is, remaining even after the applied magnetic field has been removed. This so-called trapped flux actually derives from sustaining supercurrents created in the superconductive body by the applied magnetic field. Thus, a hard superconductive body is one in which irreversible magnetic effects are present. Stated slightly differently, a hard superconductive body will evidence magnetic hysteresis when subjected to a cyclically-reversed applied magnetic field.

It is a principal object of this invention to provide a superconductive metal alloy of the substitutional type having enhanced superconductive characteristics.

Another object of this invention is to provide a superconductive metal alloy of the substitutional type which is initially atomically ordered but which contains regions of atomic disorder.

A further object of this invention is to provide a process for treating superconductive metal alloys of the substitutional type to enhance the superconductive characteristics thereof.

Other objects and advantages of this invention will be in part obvious and in part explained by reference to the accompanying specification and drawings.

Figure 2:
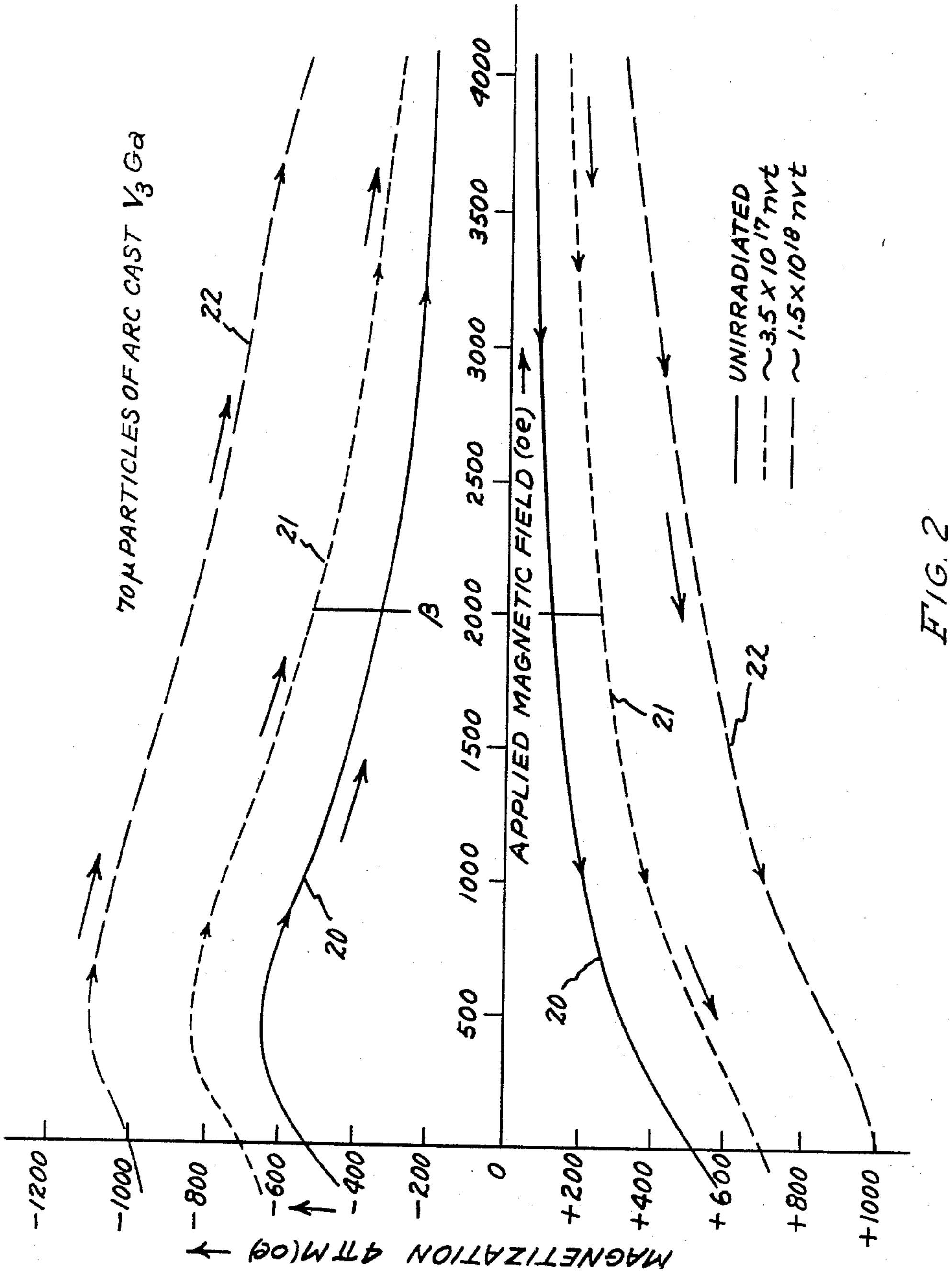

In the drawings:

FIG. 1 is a schematic drawing of the atomic arrangement on one plane of a crystal of a material according to this invention which has regions of disorder within an ordered matrix; and FIG. 2 are magnetization curves of material according to the invention showing the effect of irradiation thereon.

Very broadly, the present invention is concerned with superconductive metal alloys of the substitutional type which are atomically partially disordered and which have improved superconductive properties, notably increased current carrying capacities. Additionally, this invention concerns a process for irradiating specific types of superconductive alloys to increase their critical current carrying capacities.

Considering the invention more specifically, the superconductive alloys of this invention must be of the substitutional solid solution type, as opposed to the interstitial type of solid solution, in which the solute atoms are substituted for solvent atoms on the crystal lattice of the latter. Further, while in the normal substitutional solid solutions, the solute atoms replace solvent atoms randomly in the crystal lattice, the starting alloys of this invention must be atomically ordered. That is, each atom type considered by itself is located in regular positions on the lattice. Thus, those alloys designated in the art as "intermetallic compounds" are contemplated within the scope of this invention. Such atomically ordered alloys are commonly referred to as "super-lattice structures."

FIG. 1 of the drawings illustrates schematically the atomic structure of the superconductive alloys of this invention. Assume for discussion that the metallic solution involved has the formula $A_3B$ (which could actually be the compound $Nb_3Sn$, for example) with A representing the white atoms and B representing the black atoms. It will be seen that the atoms A are arranged in order along the crystallographic row 10 and also that atoms A and B alternate in an ordered manner in the crystallographic row 11 with the exception of an area of atomic disorder outlined by the dotted line 12. Similarly, the vertical rows of atoms, for example 15 and 16, also shown an ordered atomic arrangement. This is the type of ordered material which is necessary initially in the present invention so that regions of disorder such as those contained within the dotted lines 12 and 17 can be created. Such regions of disorder can be identified by means of X-ray photographs.

Thus, the superconductive bodies of this invention must initially, that is prior to being treated in the manner later described, be atomically ordered, it having been found that superconductive materials which are inherently atomically disordered cannot have their superconductive properties altered. Having a suitably ordered superconductive material, the regions of disorder are developed by subjecting the material to a radiation dose of not less than about $5\times10^{16}$ fast neutrons ($10^5$–$10^7$ ev.) per square centimeter (*nvt*). This irradiation is responsible for improving the critical carrying capacity of the superconductive metal alloy by causing the exchange of atoms between sites on the crystal lattices.

Bodies were produced by subjecting various ordered and disordered metals and metal alloys to various radiation doses of fast neutrons. Specifically, powders of $V_3Ga$, $V_3Si$, $Nb_3Al$, and $Nb_3Sn$ were subjected to fast neutron ($10^5$–$10^7$ ev.) doses of approximately $3\times10^{17}$ neutrons/cm.$^2$. Magnetization curves of the materials were taken at 4.2° K., both before and after irradiation. The magnitude of superconducting current density J (A./cm.$^2$) is given by:

$$J=15\beta/2\pi R$$

where:

$\beta$=magnetic hysteresis in oersteds, and
$R$=powder particle radius in centimeters.

Since the magnetic hysteresis ($\beta$) is a direct measure of the superconducting current carrying capacity of the material, it is apparent from a review of Table I that in all cases the critical current densities were greatly increased following neutron irradiation. The superconducting current densities were calculated assuming a value of $25\times10^{-4}$ cm. for R, and the measuring field intensity was of 4000 oersteds.

TABLE I

| Material | Before Irradiation | | After Irradiation | |
|---|---|---|---|---|
| | $\beta$ (oe.) | −J (A./cm.$^2$) | $\beta$ (oe.) | −J (A./cm.$^2$) |
| $V_3Si$ | 54 | $2.58\times10^4$ | 315 | $15.1\times10^4$ |
| $Nb_3Sn$ (Arc Cast) | 24 | $1.15\times10^4$ | 64 | $3.06\times10^4$ |
| $Nb_3Sn$ (Diffusion Process) | 392 | $18.8\times10^4$ | 482 | $23.1\times10^4$ |
| $V_3Ga$ | 175 | $8.38\times10^4$ | 309 | $14.8\times10^4$ |
| $Nb_3Al$ | 41 | $1.96\times10^4$ | 101 | $4.85\times10^4$ |

To test the effect of varying degrees of radiation doses, particles of $V_3Ga$ powder of about 70 micron size were subjected to radiation doses of about $1.5\times10^{18}$ (*nvt*) and about $3.5\times10^{17}$ (*nvt*) and then measured in an applied magnetic field of 4000 oersteds. FIG. 2 of the drawings clearly shows the effect of irradiation on the hysteresis values of the material as a function of radiation dose. The measurements were made at 4.2° K. and as the curves illustrate, the magnetic hysteresis (designated $\beta$) is significantly increased by fast neutron irradiation. The change in critical current density $\Delta J$ is immediately calculable from the change in magnetic hysteresis $\Delta\beta$, the changes being directly proportional.

In FIG. 2, curves 20 show the magnetic hysteresis of unirradiated material, curves 21 that of the same material given a radiation dose of $3.5\times10^{17}$ (*nvt*) and curves 22 the magnetic hysteresis of particles given a radiation dose of $1.5\times10^{18}$ (*nvt*). From these studies, it has been determined that for the disordering phenomenon to be useful, the radiation dose order should not be less than about $5\times10^{16}$ fast neutrons/cm.$^2$ nor greater than about $1\times10^{20}$ fast neutrons/cm.$^2$. At the low irradiation levels, the effect is too slight to be of value whereas at the higher level of irradiation, the entire specimen becomes disordered and the increased current density lost.

Although the present invention has been described in connection with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What I claim as new and desire to secure by Letters Patent of the United States is:

1. A process for increasing the critical current density of atomically ordered superconductive metal alloys of the substitutional type comprising subjecting the alloys to a radiation dose of not less than about $5\times10^{16}$ fast neutrons/cm.$^2$ (*nvt*) to effect partial disordering of the atomic structure of the alloys.

2. A process as described in claim 1 wherein the radiation dose is in the range of from about $5\times10^{16}$ to about $1\times10^{20}$ fast neutrons/cm.$^2$ (*nvt*).

3. A superconductive metal alloy of the substitutional type having improved superconducting properties produced by the process of claim 1.

References Cited

UNITED STATES PATENTS 3,215,569 2/1962 Kneip et al. ---------- 148—133

OTHER REFERENCES

Applied Physics Letters, vol. 4, 1964, relied on pages 43–45, 71–73 and 147–149.

Physical Metallurgy, Chalmers, John Wiley and Sons Inc., New York, 1959, relied on pp. 438 and 439.

The Iron Age, Mar. 22, 1962, pp. 80–82.

CHARLES N. LOVELL, *Primary Examiner.*

DAVID L. RECK, *Examiner.*